US00RE44774E

(19) United States
(12) Reissued Patent
Jung et al.

(10) Patent Number: US RE44,774 E
(45) Date of Reissued Patent: Feb. 25, 2014

(54) METHOD AND SYSTEM FOR TRANSMITTING AND RECEIVING BROADCAST SERVICE DATA IN A WIRELESS COMMUNICATION SYSTEM

(75) Inventors: Jung-Soo Jung, Seoul (KR); Yu-Chul Kim, Seoul (KR); Dae-Gyun Kim, Seongnam-si (KR); Beom-Sik Bae, Suwon-si (KR); Yong Chang, Seongnam-si (KR); Geun-Hwi Lim, Seongnam-si (KR); Jung-Je Son, Seongnam-si (KR)

(73) Assignee: Samsung Electronics Co., Ltd., Suwon-si (KR)

(21) Appl. No.: 13/067,854

(22) Filed: Jun. 29, 2011

Related U.S. Patent Documents

Reissue of:
(64) Patent No.: 7,616,593
Issued: Nov. 10, 2009
Appl. No.: 11/124,375
Filed: May 9, 2005

(30) Foreign Application Priority Data

May 7, 2004 (KR) ..... 2004-32404

(51) Int. Cl.
*H04B 7/00* (2006.01)

(52) U.S. Cl.
USPC ..... 370/310

(58) Field of Classification Search
USPC ..... 370/203–209, 276, 277, 282, 310–312, 370/328, 329; 455/403, 422, 42, 515, 59; 709/227–230
See application file for complete search history.

(56) References Cited

U.S. PATENT DOCUMENTS

| | | | | |
|---|---|---|---|---|
| 5,602,836 | A * | 2/1997 | Papadopoulos et al. | 370/280 |
| 5,918,170 | A | 6/1999 | Oksanen et al. | |
| 6,243,389 | B1 | 6/2001 | Khana et al. | |
| 6,308,066 | B1 * | 10/2001 | Ranta et al. | 455/436 |
| 6,505,058 | B1 | 1/2003 | Willey | |
| 6,522,670 | B1 * | 2/2003 | Jokinen et al. | 370/503 |
| 7,020,102 | B2 | 3/2006 | Tuomainen et al. | |

(Continued)

FOREIGN PATENT DOCUMENTS

| | | |
|---|---|---|
| KR | 1020020068341 | 8/2002 |
| KR | 1020030002303 | 1/2003 |

(Continued)

OTHER PUBLICATIONS

IEEE 100 The Authoritative Dictionary of IEEE Standards Terms, IEEE, 7th edition, 2000, 3 pages.*

(Continued)

*Primary Examiner* — Dmitry H Levitan
(74) *Attorney, Agent, or Firm* — Roylance, Abrams, Berdo & Goodman, LLP

(57) ABSTRACT

A method and system are provided for transmitting broadcast service data in a wireless communication system using an Orthogonal Frequency Division Multiple Access (OFDMA) scheme in which data transmission is achieved through a downlink and an uplink within one frame. The system being connected to a broadcast server. The system and method include allocating a connection identifier (CID) to each broadcast service for identification of a broadcast service packet transmitted over the downlink, and transmitting broadcast service information for each broadcast service; and receiving a broadcast packet from the broadcast server, and transmitting a physical layer transmission information element (DL-MAP) including a broadcast service CID for the broadcast packet through the downlink0.

41 Claims, 10 Drawing Sheets

| Syntaxes | Size |
|---|---|
| MBS-CFG message format() { | |
| Management Message Type | 8 bits |
| Next MBS-CFG transmission frame offset | 9 bits |
| N_MBS_Configuration | 7 bits |
| for (I = 0 ; I < N_MBS_Configuration ; I++) { | |
| MBS_Configuration_IE() | Variable |
| } | |
| if !(byte boundary) { | |
| Padding nibble | 4 bits |
| } | |
| } | |

(56) References Cited

U.S. PATENT DOCUMENTS

| | | | | |
|---|---|---|---|---|
| 7,792,121 | B2 * | 9/2010 | Thompson et al. | 370/395.4 |
| 2001/0022781 | A1 | 9/2001 | Makipaa | |
| 2002/0116719 | A1 | 8/2002 | Drapper et al. | |
| 2005/0201269 | A1 | 9/2005 | Shim et al. | |

FOREIGN PATENT DOCUMENTS

| | | |
|---|---|---|
| KR | 1020040007403 | 1/2004 |
| WO | WO0213440 | 2/2002 |
| WO | WO03045064 | 5/2003 |

OTHER PUBLICATIONS

IEEE Standard for Local and Metropolitan Area Networks, 802.16a, Part 16,(2003).

Yong Chang et al., "Enhanced Broadcast/Multicast Capabilities", IEEE 802.16 Broadband Wireless Access Working Group, XP002589778 (2004).

802.16a, Part 16, IEEE Standard for Local and metropolitan area networks, Apr. 1, 2003, IEEE, pp. 1-318.*

* cited by examiner

| Syntaxs | Size |
|---|---|
| DL-MAP_IE() { | |
| DIUC | 4 bits |
| if (DIUC == 15) { | |
| Extended DIUC dependent IE | variable |
| } else { | |
| if (INC_CID == 1) { | |
| N_CID | 8 bits |
| for (n=0; n< N_CID; n++) { | |
| CID | 16 bits |
| } | |
| } | |
| OFDMA Symbol offset | 10 bits |
| Subchannel offset | 5 bits |
| Boosting | 3 bits |
| No. OFDMA Symbols | 9 bits |
| No. Subchannels | 5 bits |
| } | |
| } | |

FIG.1
(PRIOR ART)

| Syntaxes | Size |
|---|---|
| MBS-CFG message format() { | |
| Management Message Type | 8 bits |
| Next MBS-CFG transmission frame offset | 9 bits |
| N_MBS_Configuration | 7 bits |
| for (I = 0 ; I < N_MBS_Configuration ; I++) { | |
| MBS_Configuration_IE() | Variable |
| } | |
| if !(byte boundary) { | |
| Padding nibble | 4 bits |
| } | |
| } | |

FIG.2

| Syntaxes | Size |
|---|---|
| MBS_Configuration_Normal_IE() { | |
| N_MBS | 4 bits |
| for (I = 0 ; I < N_MBS ; I++) { | 4 bits |
| MBS CID | 16 bits |
| } | |
| Physical Frequency | 32 bits |
| Transmission start frame offset | 8 bits |
| Transmission frame length | 4 bits |
| Transmission frame period index | 8 bits |
| } | |

FIG.3

| Syntaxes | Size |
|---|---|
| MBS_Configuration_Normal_IE() { | |
| N_MBS | 4 bits |
| for (I = 0 ; I < N_MBS ; I++) { | 4 bits |
| MBS CID | 16 bits |
| DIUC | 8 bits |
| OFDMA Symbol offset | 10 bits |
| Subchannel offset | 5 bits |
| No. OFDMA Symbols | 9 bits |
| No. Subchannels | 5 bits |
| } | |
| Physical Frequency | 32 bits |
| Transmission start frame offset | 8 bits |
| Transmission frame length | 4 bits |
| Transmission frame period index | 8 bits |
| } | |

FIG.4

| Syntaxes | Size | Notes |
|---|---|---|
| BMAP_IE { | | |
| Extended DIUC | 4 bits | BMAP = 0x05 |
| Length | 4 bits | Length = 0x01 |
| Offset | 8 | |

FIG.6

| Syntaxes | Size | Notes |
|---|---|---|
| BMAP_IE { | | |
| Extended DIUC | 4 bits | BMAP = 0x05 |
| Length | 4 bits | Length = 0x03 |
| CID | 16 bits | |
| Offset | 8 bits | |

FIG.7

| | | | | | | | |
|---|---|---|---|---|---|---|---|
| HT (1) | EC (1) | Type and Rsvd (6) | RSV (1) | CI (1) | EKS (2) | RSV (1) | LEN MSB (3) |
| LEN LSB (8) | | | CID MSB (8) | | | | |
| CID LSB (8) | | | HCS (8) | | | | |

FIG.8

METHOD AND SYSTEM FOR TRANSMITTING AND RECEIVING BROADCAST SERVICE DATA IN A WIRELESS COMMUNICATION SYSTEM

Matter enclosed in heavy brackets [ ] appears in the original patent but forms no part of this reissue specification; matter printed in italics indicates the additions made by reissue.

PRIORITY

This application claims the benefit under 35 U.S.C. § 119 (a) of an application entitled "Method and System for Transmitting and Receiving Broadcast Service Data in a Wireless Communication System" filed in the Korean Intellectual Property Office on May 7, 2004 and assigned Serial No. 2004-32404, the entire contents of which are incorporated herein by reference.

BACKGROUND OF THE INVENTION

1. Field of the Invention

The present invention relates generally to a method and system for transmitting and receiving data in a wireless communication system. In particular, the present invention relates to a method and system for transmitting and receiving broadcast service data in a wireless communication system.

2. Description of the Related Art

In a wireless communication system, the term "data" generally refers to unicast data transmitted from one subscriber station (SS) or one system to another SS or another system. Unicast data transmitted such that it can be received at only an individual SS, is transmitted at the request of a corresponding user. However, with the development of wireless communication technology, there has been a growing demand for receiving broadcast service provided in the public network even in a wireless communication system. The broadcast service, unlike the unicast service, is characterized by a plurality of SSs being able to receive the same traffic.

A mobile communication system using cellular technology is presented as a typical example of a wireless communication system. The cellular mobile communication system has developed from the conventional system capable of supporting only voice communication into an advanced system capable of supporting high-speed data transmission. Recently, research relating to mobile communication systems has been conducted to provide a broadcast service using $3^{rd}$ Generation Partnership Project (3GPP) and $3^{rd}$ Generation Partnership Project 2 (3GPP2), which are standardization groups for a $3^{rd}$ generation (3G) mobile communication system.

However, the mobile communication system has a difficulty in efficiently providing the broadcast service in terms of a data rate. That is, the mobile communication system basically uses a Code Division Multiple Access (CDMA) scheme, and its frequency band is fixed. The CDMA mobile communication system spreads data using Walsh codes prior to transmission. The Walsh codes are limited resources, and extension of the codes thereof is very difficult.

Accordingly, there is a demand for a new scheme, which is not simply dependent on the CDMA scheme, to provide a broadcast service in a wireless communication system.

SUMMARY OF THE INVENTION

It is, therefore, an object of the present invention to provide a method and system for efficiently transmitting and receiving a broadcast service in a wireless communication system.

It is another object of the present invention to provide a method and system for transmitting and receiving a broadcast service at high speed in a wireless communication system.

It is further another object of the present invention to provide a method and system for transmitting and receiving a broadcast service without the influence of spreading code resources in a mobile communication system.

According to one aspect of the present invention, there is provided a method for transmitting broadcast service data in a wireless communication system using an Orthogonal Frequency Division Multiple Access (OFDMA) scheme in which data transmission is achieved through a downlink and an uplink within one frame, the system being connected to a broadcast server. The method comprising the steps of allocating a connection identifier (CID) to each broadcast service for identification of a broadcast service packet transmitted over the downlink, and transmitting broadcast service information for each broadcast service; and receiving a broadcast packet from the broadcast server, and transmitting a physical layer transmission information element (DL-MAP) comprising a broadcast service CID for the broadcast packet through the downlink.

According to another aspect of the present invention, there is provided a method for receiving broadcast service data in a wireless communication system using an Orthogonal Frequency Division Multiple Access (OFDMA) scheme in which data transmission is achieved through a downlink and an uplink within one frame. The system being connected to a broadcast server for transmitting a broadcast service packet and its associated broadcast service connection identifier (CID) using a physical layer transmission information element (DL-MAP). The method comprising the steps of receiving broadcast service information for a desired broadcast service from the wireless communication system; detecting a desired broadcast service CID from a DL-MAP for frames received through the downlink; and receiving a broadcast service packet by acquiring position information of a broadcast service packet using the broadcast service CID when there is a packet comprising the broadcast service CID.

According to further another aspect of the present invention, there is provided a system for providing broadcast service data in a wireless communication system using an Orthogonal Frequency Division Multiple Access (OFDMA) scheme in which data transmission is achieved through a downlink and an uplink within one frame. The system comprising a broadcast server for providing broadcast service data; and a broadcast service controller for receiving broadcast content data from the broadcast server, storing the received broadcast content data in a buffer thereof, and providing a broadcast service packet and configuration information of the broadcast service packet through the downlink of the wireless communication system if the broadcast content data stored in the buffer satisfies a predetermined condition.

BRIEF DESCRIPTION OF THE DRAWINGS

The above and other objects, features and advantages of the present invention will become more apparent from the following detailed description when taken in conjunction with the accompanying drawings in which:

FIG. 1 is a diagram illustrating a format of a physical layer transmission information element used in an 802.16 system;

FIG. 2 is a diagram illustrating a format of a broadcast configuration (MBS-CFG) message transmitted from a base station (BS) supporting a semi-static broadcast traffic transmission method to subscriber stations (SSs) according to an embodiment of the present invention;

FIG. 3 is a diagram illustrating a format of a broadcast configuration block (MBS_Configuration_IE) according to an embodiment of the present invention;

FIG. 4 is a diagram illustrating a format of a broadcast configuration block (MBS_Configuration_IE) used for providing a broadcast service according to a second embodiment of the present invention;

FIG. 6 is a diagram illustrating a format of a physical layer transmission information element (BMAP_IE) for indicating a transmission time of a broadcast service according to a second embodiment of the present invention;

FIG. 7 is a diagram illustrating another format of a physical layer transmission information element (BMPA_IE) for indicating a transmission time of a broadcast service according to the second embodiment of the present invention;

FIG. 8 is a diagram illustrating a format of a media access control (MAC) layer header used in an 802.16 system;

Throughout the drawings, the same element is designated by the same reference numeral or character.

DETAILED DESCRIPTION OF EXEMPLARY EMBODIMENTS

Figure 5:
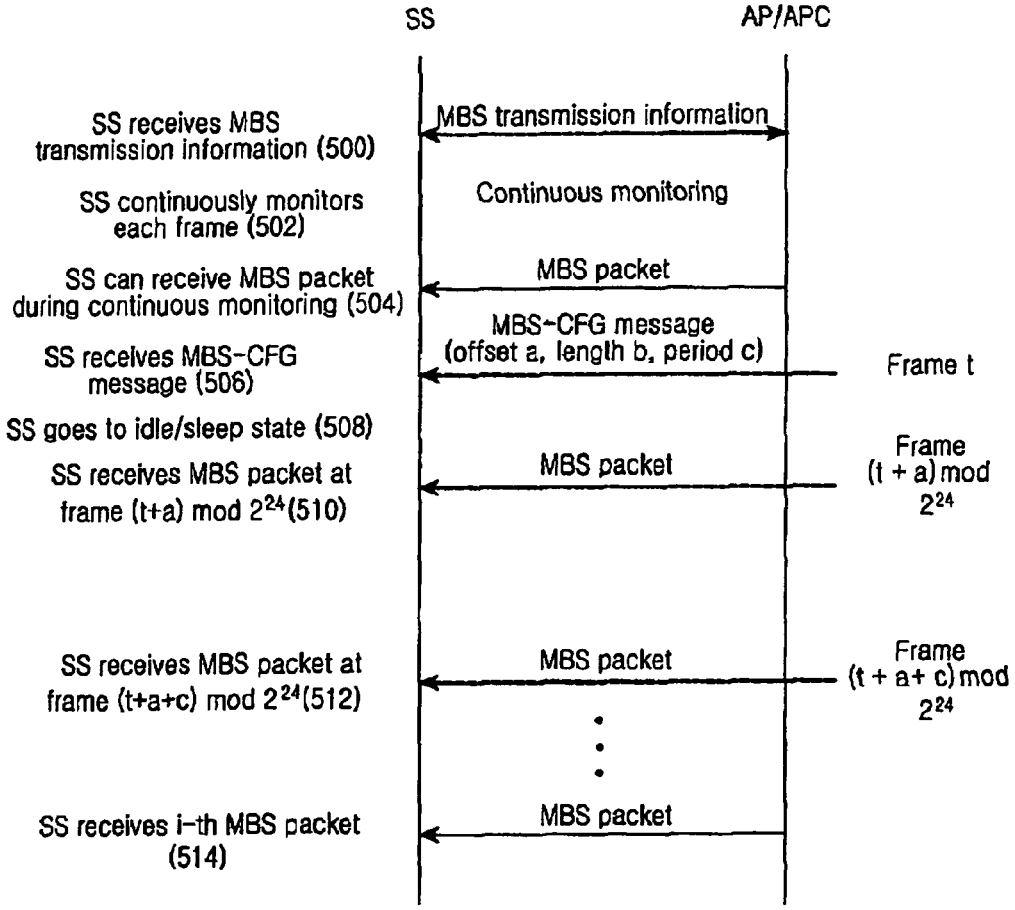
FIG. 5 is a signaling diagram illustrating a procedure for transmitting/receiving broadcast traffic using a semi-static broadcast transmission method according to an embodiment of the present invention.

Several embodiments of the present invention will now be described in detail with reference to the accompanying drawings. In the following description, a detailed description of known functions and configurations incorporated herein has been omitted for conciseness.

The present invention provides a system and method for providing a broadcast service in a wireless communication system. The present invention supports a broadcast service at a high data rate which is higher than that of the 3$^{rd}$ generation (3G) mobile communication system having a mid/low data rate compared with that of a system using Institute of Electrical and Electronics Engineers (IEEE) 802.16 technology (hereinafter referred to as an "802.16 system." The 802.16-REVd/D4-2004 standard is incorporated herein by reference. Herein, a description will be made of an Orthogonal Frequency Division Multiplexing (OFDM) scheme in addition to several physical layer technologies used in the 3G mobile communication system. Also, a method for efficiently reducing power consumption in the 3G mobile communication system will be described. In addition, to help understand the present invention, a brief explanation for some abbreviations or acronyms used in the present application is provided as follows:

MBS: stands for Multicast and Broadcast Service.

DL-MAP: stands for Down Link Map, which is a MAC (Media Access Control) layer message for informing a location and occupied region of a burst transmitted in a frame and a MCS (Modulation and Coding Scheme) scheme.

DIUC: stands for Downlink Interval Usage Code, which is a field used in DL-MAP and for expressing MCS information for each burst.

The following description presents (1) a method for transmitting a broadcast service and identifying a broadcast packet, (2) a method for continuously receiving a broadcast service, (3) a method for efficiently reducing reception power, and (4) a method for increasing efficiency of reception power using a physical layer transmission information element in a dynamic broadcast transmission method.

[1] Method for Transmitting Broadcast Service and Identifying Broadcast Packet

In a high-speed wireless communication system directed primarily at unicast service, in order to support a broadcast service, a base station (BS) should be able to indicate whether a transmission physical layer frame comprises a broadcast packet and whether a particular packet is a broadcast packet. To this end, the BS should inform subscriber stations (SSs) when a broadcast packet is transmitted. As an alternative method, the BS can indicate a physical layer frame over which a broadcast packet is transmitted, by recording information indicating the inclusion of a broadcast packet in the physical layer frame over which the corresponding broadcast packet is transmitted, before transmitting the physical layer frame. Therefore, the BS writes an identifier (ID) allocated for broadcast in a header of a medium access control (MAC) layer packet for each of broadcast services included in a physical layer frame so that SSs can determine whether a particular packet is a broadcast packet.

In the 802.16 system, an exemplary system to which the present invention is applied, the method for identifying a broadcast service packet allocates a particular connection ID (CID) to each broadcast service and writes the allocated CID in a MAC layer packet for each broadcast packet prior to transmission. In addition, the method writes information indicating transmission of a broadcast service in a physical layer transmission information element (DL-MAP) through which the broadcast services are transmitted so that an SS receiving the physical layer transmission information element can determine whether a broadcast packet is included in a corresponding frame.

FIG. 1 is a diagram illustrating a format of a general physical layer transmission information element used in an 802.16 system. The physical layer transmission information element of FIG. 1 illustrates a downlink MAP information element (DL-MAP). With reference to FIG. 1, a format of the general physical layer transmission information element used in the 802.16 system will be described below.

Referring to FIG. 1, a 'DIUC' field, a field indicating a transmission type popularly used in the 802.16 system, indicates a downlink transmission type for a channel specified in the physical layer transmission information element. A 'INC_CID' field indicates whether a CID is included in the corresponding physical layer transmission information element. An 'N_CID' field indicates the number of CIDs included in the corresponding physical layer transmission information element, and a 'CID' field indicates a CID of data transmitted over a channel indicated by the physical layer transmission information element. An 'OFDMA Symbol offset' field indicates a start point of an OFDMA symbol through which corresponding data is transmitted within a frame, and a 'No. OFDMA Symbols' field indicates the number of the OFDMA symbols. A 'Subchannel offset' field indicates a start point of a channel over which corresponding data is transmitted, and a 'No. Subchannels' field indicates the number of corresponding channels. A 'Boosting' field indicates an additional power level used for transmission of corresponding data.

In this section, a description will be made of a method for writing a point or location of a broadcast service packet in a physical layer frame using the physical layer transmission information element illustrated in FIG. 1 to provide a broadcast service.

The present invention provides a method for setting a value of the 'INC_CID' field indicating inclusion of a CID among the fields of the physical layer transmission information element, to '0', and indicates a point where a broadcast service packet is transmitted, using the 'OFDMA Symbol offset' field, the 'No. OFDMA Symbols' field, the 'Subchannel offset' field, and the 'No. Subchannels' field. A SS receiving the physical layer transmission information element set in this manner, can recognize that a packet transmitted at the point indicated by the 'OFDMA Symbol offset' field, the 'No. OFDMA Symbols' field, the 'Subchannel offset' field, and the 'No. Subchannels' field is a broadcast service packet, depending on the fact that a value of the 'INC_CID' field is set to '0'. In addition, the SS can recognize a point where the broadcast service packet is located, using the foregoing fields, and can receive the broadcast service packet according to the result. The SS determines whether corresponding broadcast is its desired broadcast through a CID in a MAC layer header of the received packet. If the received broadcast is its desired broadcast, the SS transmits the corresponding packet to an upper layer. However, if the received broadcast is not its desired broadcast, the SS discards the corresponding packet.

[2] Method for Continuously Receiving Broadcast Service

In a high-speed broadcast service system according to an embodiment of the present invention, a basic method for transmitting broadcast content is as follows. When broadcast service data is transmitted from a broadcast server to a broadcast service controller, the broadcast service controller stores the broadcast service data in its buffer. The broadcast service controller transmits the broadcast packet to SSs in each cell if a size of the data stored in its buffer is greater than a predetermined threshold, or at a transmission time determined based on Quality-of-Service (QoS) of the broadcast. In this method, for the time at which each broadcast is transmitted, transmission characteristics such as a data rate (source rate) and a transmission delay of the broadcast service change with the passage of time.

For example, if a source rate of a particular broadcast service instantaneously increases or decreases, a transmission time of the corresponding broadcast service instantaneously goes ahead or falls behind. If a transmission time for a particular broadcast service dynamically changes in this way, an SS cannot determine the time at which broadcast packets will be transmitted. Therefore, the SS should always monitor a broadcast channel transmitted in the downlink direction. As a result, the SS should receive and process even the downlink transmission frames which are not related to reception of the broadcast service, resulting in a considerable increase in its power consumption. Therefore, in the next section, a method for increasing the efficiency of reception power for a broadcast service will be described.

[3] Method for Increasing Efficiency of Reception Power

In this section, a description will be made of a semi-static broadcast transmission/reception technique capable of reducing power consumption by observing only the downlink transmission frames associated with a broadcast service in receiving the broadcast service by an SS in an 802.16 system according to an embodiment of the present invention.

(A) Method for Increasing Efficiency of Reception Power by Fixing Broadcast Transmission Time A description will now be made of a broadcast transmission/reception method using the semi-static broadcast transmission technique according to an embodiment of the present invention to reduce use of reception power for SSs receiving a broadcast service.

In the method according to this embodiment of the present invention, a broadcast service controller previously determines a transmission time for each of broadcast services in service for a long time interval. The broadcast service controller transmits information on the transmission time in the message format to SSs via a BS on a unicast basis or on a broadcast basis. An SS receiving transmission time information for its desired broadcast services, can reduce power consumption due to unnecessary downlink reception by transitioning to an idle mode or a sleep mode. The SS in the idle mode or the sleep mode receives a downlink channel at the time when its desired broadcast is transmitted, in addition to the periodic data that the SS should necessarily receive in the idle mode or the sleep mode. In the other time period, the SS stops reception of a downlink channel, thereby minimizing power consumption due to reception of broadcast service.

A message used for receiving a broadcast service in this method will now be described. FIG. 2 is a diagram illustrating a format of a broadcast configuration (MBS-CFG) message transmitted from a BS supporting the novel semi-static broadcast traffic transmission method to SSs according to an embodiment of the present invention.

The broadcast configuration message illustrated in FIG. 2 indicates a period between a frame for which a particular broadcast is transmitted and each transmission and also indicates the number of consecutive frames used for one transmission, so that even though an SS receiving this message does not continuously receive a downlink channel, the SS can determine the point where the particular broadcast begins or is transmitted. In addition, the broadcast configuration message describes the next time at which the broadcast configuration message is to be transmitted, so that even though an SS receiving this message does not continuously receive a downlink channel, the SS can receive the broadcast configuration message at predetermined intervals. The broadcast service controller fixes the time when a particular broadcast is transmitted for every transmission period of the broadcast configuration message, and if it is desired to change the transmission time and the transmission method, the broadcast service controller indicates a new transmission method during transmission of the next broadcast configuration message. After transmitting the broadcast configuration message, the broadcast service controller can transmit the next broadcast configuration messages using the indicated new transmission method.

Referring to FIG. 2, a 'Management Message Type' field, a field indicating a type of a corresponding message, can have a particular value appropriate for the broadcast configuration message. A 'Next MBS-CFG transmission frame offset' field indicates the next time at which the broadcast configuration message is transmitted. A 'N_MBS_Configuration' field indicates the number of broadcast transmission information elements included in the broadcast configuration message, and a 'MBS_Configuration_IE( )' field is a block indicating the detailed broadcast transmission information element. A detailed description of the 'MBS_Configuration_IE( )' field will be given later. A 'Padding nibble' field is a dummy field attached to make the broadcast configuration message comprise 8 bits.

FIG. 3 is a diagram illustrating a format of a broadcast configuration block (MBS_Configuration_IE) according to an embodiment of the present invention. With reference to FIG. 3, a format of the broadcast configuration block will be described below.

In the MBS_Configuration_IE( ) block, an 'N_MBS' field indicates the number of broadcast services included in this block. As many 'MBS CID' fields as the number indicated by the 'N_MBS' field are included in the MBS_Configuration_IE( ) block, and the 'MBS CID' field indicates a CID corresponding to a particular broadcast. A 'Physical Frequency' field indicates information on a frequency band in which broadcast services corresponding to the CID are transmitted. A 'Transmission start frame offset' field indicates an interval between a physical layer frame in which a broadcast service is included and the current frame, and a 'Transmission frame length' field indicates the number of consecutive frames used for broadcast transmission. Finally, a 'Transmission frame period index' field indicates a period for which the corresponding broadcast is transmitted next.

(B) Method for Increasing Efficiency of Reception Power by Designating Point of Broadcast Data in a Physical Layer Frame A description will now be made of a method for transmitting, to an SS, information on a point or location in broadcast data in a physical layer frame over which broadcast is transmitted, so as to reduce use of reception power for SSs desiring to receive the broadcast. The broadcast service controller according to an embodiment of the present invention designates a transmission time for each of broadcast services in service plus a transmission point of a corresponding broadcast in a physical layer frame for the transmission time, and transmits information on the transmission time to SSs via a BS on a unicast basis or on a broadcast basis. Therefore, each SS receives a transmission time plus a transmission point in a frame for each of its desired broadcast services. Thereafter, when receiving a corresponding frame at a transmission time of the corresponding broadcast, the SS receives only the channels in the previously designated point, thereby minimizing power consumption needed for reception of a physical layer frame over which the broadcast is transmitted. When a particular SS operates in an idle mode or a sleep mode, the SS selectively receives only the channels in the previously designated point in a physical layer frame at the time when its desired broadcast is transmitted, in addition to the periodic data that the SS should necessarily receive in the idle mode or the sleep mode, thereby minimizing power consumption due to reception of broadcast service.

In order to selectively receive only the channels in the point designated in a physical layer frame at the time when a desired broadcast is transmitted, the foregoing broadcast configuration block should be modified. FIG. 4 is a diagram illustrating a format of a broadcast configuration block (MBS_Configuration_IE) used for providing a broadcast service according to a second embodiment of the present invention.

FIG. 4 illustrates a modified MBS_Configuration_IE block provided to specify a point in a frame, at which a particular broadcast is transmitted. In the modified MBS_Configuration_IE block, a start point, indicated by the 'OFDMA Symbol offset' field, of a symbol transmitted in a particular frame over which a broadcast corresponding to a particular MBS CID is transmitted; the number of symbols, indicated by the 'No. OFDMA Symbols' field; a start point of a channel used at the time, indicated by the 'Subchannel offset' field; the number of channels, indicated by the 'No. Subchannel offset' field; and a transmission type used in the transmission period, indicated by the 'DIUC' field, can be newly specified.

(C) Broadcast Reception Process

A description will now be made of a signaling procedure for efficiently transmitting/receiving broadcast traffic using the foregoing method. FIG. 5 is a signaling diagram illustrating a procedure for transmitting/receiving broadcast traffic using a semi-static broadcast transmission method according to an embodiment of the present invention.

Referring to FIG. 5, in step 500, an SS receives broadcast-related information such as a CID and encryption information for a corresponding broadcast service from among its desired broadcasts. The SS receiving a CID for its desired broadcast, continuously receives a downlink channel in steps 502 and 504 before receiving a broadcast configuration message, analyzes packets transmitted to the CID, and receives the broadcast according to the analysis result. The SS continuously receiving a downlink channel, receives a broadcast configuration message transmitted at a particular time, in step 506. Because the broadcast configuration message comprises transmission time information such as offset, length and period of a broadcast desired by the SS, the SS can determine a time at which the next broadcast is to be received even though it does not continuously receive a downlink channel. In step 508, the SS transitions to an idle mode or a sleep mode to reduce power consumption. Thereafter, the SS can receive the transmitted broadcast service packet even in the idle mode or the sleep mode in steps 510 to 514.

[4] Method for Increasing Efficiency of Reception Power Using Physical Layer Transmission Information in Dynamic Broadcast Transmission Method In this section, a description will be made of a method for reducing power consumption by observing only the downlink transmission frames associated with a broadcast service in receiving the broadcast service by an SS in an 802.16 system according to a second embodiment of the present invention. The second embodiment provides a method for modifying and transmitting a physical layer transmission information element of a physical layer frame over which a broadcast is transmitted during broadcast transmission.

(A) Method for Increasing Efficient of Reception Power Using Through Modification of Physical Layer Transmission Information The second embodiment of the present invention records, in a physical layer transmission information element (DL-MAP) of a physical layer frame over which a broadcast is transmitted, information on a time at which the broadcast services transmitted over the frame will be transmitted next, so as to reduce use of reception power for SSs desiring to receive the broadcast. In this method, an SS receiving the physical layer frame can determine the time at which it should observe a downlink channel to receive a particular broadcast even through the SS does not continuously receive the downlink channel. That is, a BS specifies, in a physical layer transmission information element of a physical layer frame for transmitting particular broadcasts, e.g., Munhwa Broadcasting Corporation (MBC) and Korean Broadcasting System (KBS), a time in the physical layer frame, at which MBC is transmitted next, and a time in the physical layer frame, at which KBS is transmitted next, and then transmits the time information-specified physical layer transmission information element to SSs in its cell. A SS receiving the time information, receives MBC and KBS and analyzes physical layer transmission information included in the corresponding physical layer frame thereby extracting information on the next time at which MBC and KBS will be transmitted.

In order to support the foregoing method, it is necessary to modify a format of a physical layer transmission information element (BMAP_IE). FIG. 6 is a diagram illustrating a format of a physical layer transmission information element BMAP_IE for indicating a transmission time of a broadcast service according to a second embodiment of the present invention. With reference to FIG. 6, a description will now be made of a format of a physical layer transmission information element BMAP_IE according to the second embodiment of the present invention.

An 'Offset' field of the BMAP_IE illustrated in FIG. 6 indicates a difference in point or location between the current frame and the frame for which the broadcasts included in the corresponding frame are transmitted next. A SS receiving a physical layer transmission information element indicating inclusion of a broadcast packet, can receive broadcast packets of the corresponding frame and determine a point of the next frame over which the corresponding broadcasts will be transmitted, using the BMAP_IE included in the frame.

FIG. 7 is a diagram illustrating another format of a physical layer transmission information element BMPA_IE for indicating a transmission time of a broadcast service according to the second embodiment of the present invention. With reference to FIG. 7, a description will now be made of another format of a physical layer transmission information element BMAP_IE.

Aside from the predefined 'Offset' field, a CID for a broadcast can be described in the physical layer transmission information element BMAP_IE of FIG. 7. With the use of the BMAP_IE, it is possible to describe a different broadcast time for each of different broadcasts corresponding to different CIDs. That is, it is possible to correctly express different broadcast times for different broadcasts by separately describing the BMAP_IEs for different broadcasts having different broadcast times in one frame.

(B) Method for Increasing Efficiency of Reception Power Through Modification of MAC Layer Header In order to reduce use of reception power for SSs desiring to receive a broadcast, a BS writes, in a MAC Layer header of a transmission broadcast packet, information on a time at which the broadcast service will be transmitted next in the packet. In this method, an SS receiving the broadcast packet can determine the next time when it should observe a downlink channel to receive a particular broadcast, even though the SS does not continuously receive the downlink channel. That is, when transmitting two MAC layer packets including particular broadcasts, for example, MBC and KBS, with one physical layer frame, a BS specifies a time of the physical layer frame, at which MBC will be transmitted next, in a header of a MAC layer packet comprising MBC, and specifies a time of the physical layer frame, at which KBS will be transmitted next, in a header of a MAC layer packet comprising KBS, and transmits the time information-specified MAC layer packets to each of the SSs. A SS receiving the time information, receives MBC and KBS and analyzes information on the corresponding MAC layer packet thereby extracting information on the next time at which MBC and KBS will be transmitted.

A description will now be made of a format of a MAC layer header used in the 802.16 system. FIG. 8 is a diagram illustrating a format of a MAC layer header used in the 802.16 system.

Referring to FIG. 8, a 'Header Type (HT)' field indicates a type of corresponding header, and an 'Encryption Control (EC)' field indicates whether encryption is used. A 6-bit 'Type' field indicates a type of a sub-header or a format of a MAC layer packet, and a 'CRC Indicator (CI)' field indicates whether CRC is added to a MAC layer packet. An 'Encryption Key Sequence (EKS)' field indicates sequence information of en encryption key, and 'Reserved (RSV)' fields are fields reserved for future use. A 'LEN' field indicates a length of a MAC layer packet, and a 'CID' field indicates a CID associated with the corresponding MAC layer packet. Finally, a 'Header Check Sequence (HCS)' field serves as a checksum for checking an error for the header.

In the MAC layer header for a broadcast packet, if a specific bit, for example, a bit #0 or a bit #4, of the 'Type' field is set to '1', or if one of the two 'RSV' fields is set to '1', it is used as a sub-header that specifies the next transmission time of the corresponding broadcast.

Figure 9:
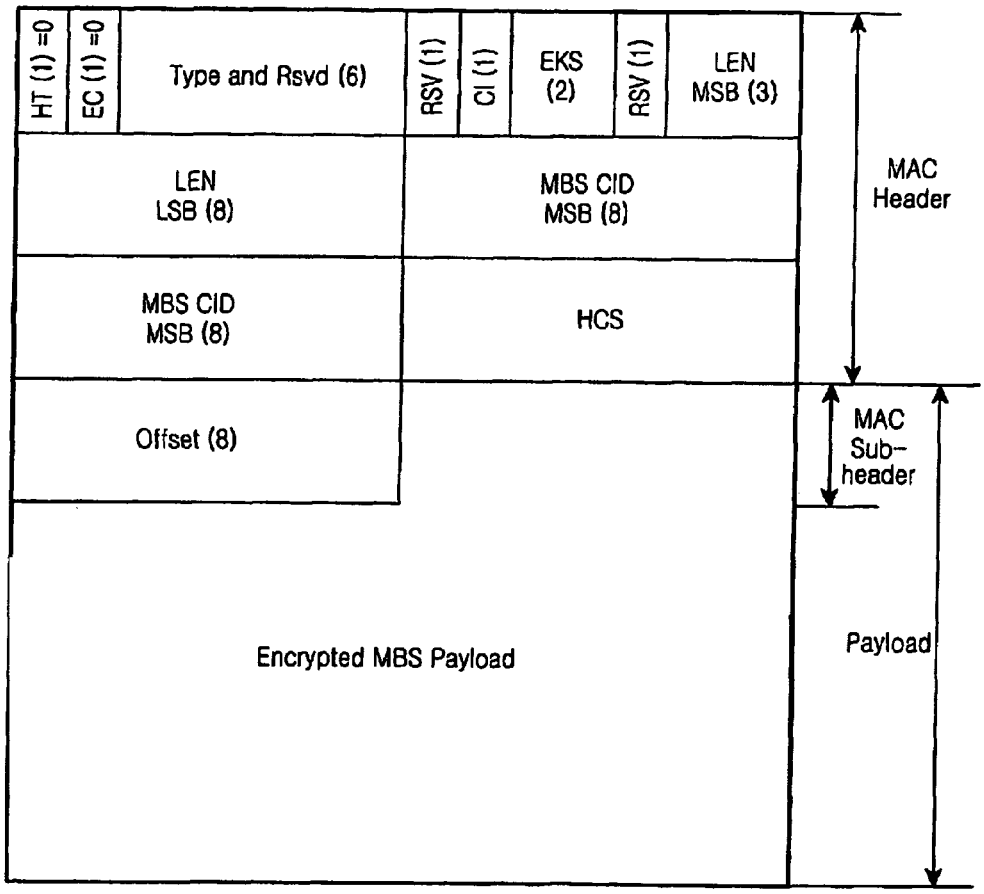
FIG. 9 is a diagram illustrating a format of a MAC layer header that specifies the next transmission time of broadcast traffic according to an embodiment of the present invention.

A method for using the sub-header will now be described. FIG. 9 is a diagram illustrating a format of a MAC layer header that specifies the next transmission time of broadcast traffic according to an embodiment of the present invention.

Referring to FIG. 9, the MAC layer header according to an embodiment of the present invention has a new MAC layer header format to which an 8-bit 'Offset' field is added. The 'Offset' field is used to indicate an interval between the current frame and the frame for which a broadcast transmitted with a MAC layer packet is to be transmitted next.

Therefore, an SS receiving the MAC layer header can determine the next transmission time of a broadcast associated with a corresponding CID (MBC CID) using the 'Offset' field. That is, if the current frame over which a broadcast has been received is an $n^{th}$ frame, the SS can recognize that a frame at which the broadcast will arrive next becomes an $\{(n+\text{Offset}) \bmod 2^{24} (=\text{maximum frame number}+1)\}^{th}$ frame.

(C) Process of Receiving Broadcast with Efficient Reception Power Using Physical Layer Transmission Information A description will now be made of a process of transmitting/receiving broadcast packets between an SS and a BS using physical layer transmission information in a dynamic broadcast transmission method.

Figure 10:
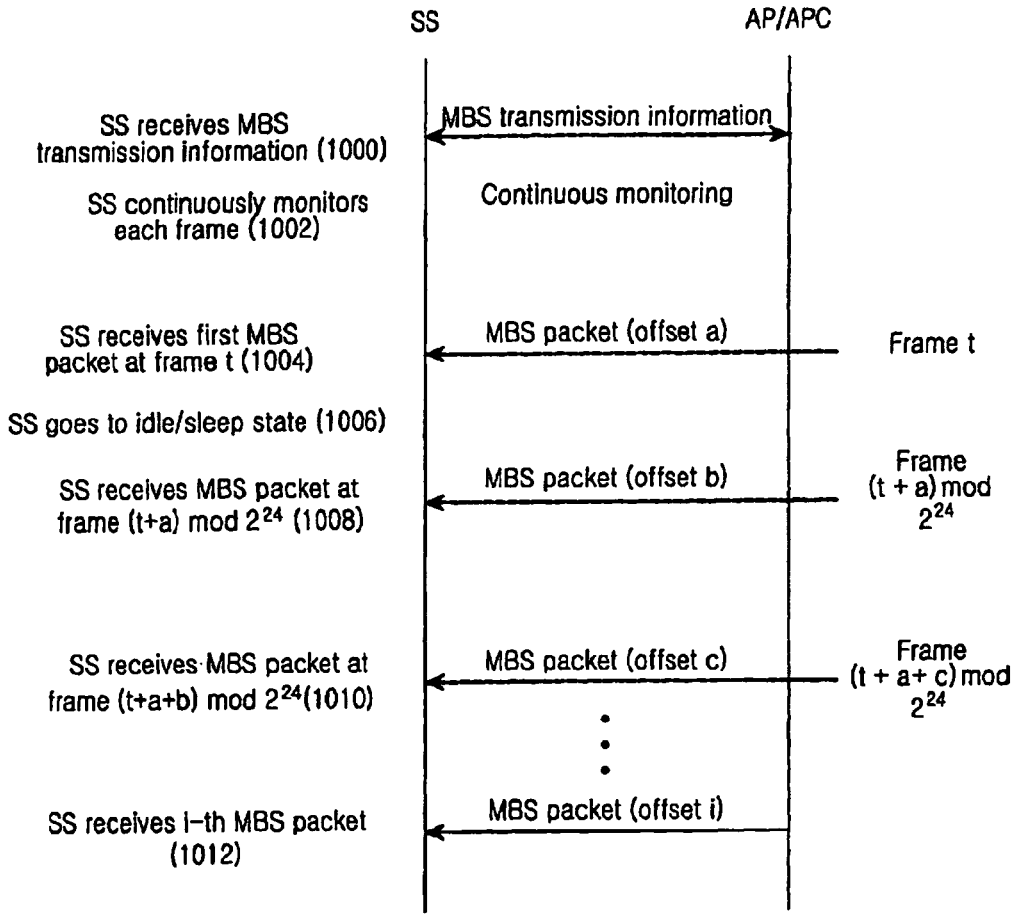
FIG. 10 is a signaling diagram illustrating a process of transmitting and receiving broadcast packets between an SS and a BS using a dynamic broadcast transmission method according to the second embodiment of the present invention.

FIG. 10 is a signaling diagram illustrating a process of transmitting and receiving broadcast packets between an SS and a BS using a dynamic broadcast transmission method according to the second embodiment of the present invention.

Referring to FIG. 10, in step 1000, an SS receives broadcast-related information such as a CID and encryption information for a corresponding broadcast from among its desired broadcasts. The SS receiving a CID for its desired broadcast, continuously receives a downlink channel in step 1002 before it initially receives the corresponding broadcast packet. The SS continuously receiving the downlink channel, receives a first packet for its desired broadcast in step 1004, and can acquire the next transmission time information (Offset) included in a MAC layer header for the packet. The SS receiving the next transmission time information for the corresponding packet, can determine a time at which the next broadcast is to be received even though it does not continuously receive a downlink channel. In step 1006, the SS transitions to an idle mode or a sleep mode to reduce power consumption. Thereafter, in step 1008, the SS can receive the next broadcast packet using the received broadcast transmission time information and acquire transmission time information of the next broadcast packet from a MAC layer header of the packet. Therefore, the SS can receive the transmitted broadcast packets in steps 1010 to 1012. In this manner, the SS can continuously receive its desired broadcast packets even in the idle mode or the sleep mode.

As can be understood from the foregoing description, the method can provide a high-speed broadcast service in the 802.16 system, for example. In addition, the novel method transmits broadcast packets using a dynamic or semi-static method so that a reception apparatus can efficiently reduce reception power.

While the invention has been shown and described with reference to certain embodiments thereof, it will be understood by those skilled in the art that various changes in form and details may be made therein without departing from the spirit and scope of the invention as defined by the appended claims.

What is claimed is:

1. A method for transmitting broadcast service data in a wireless communication system using an Orthogonal Frequency Division Multiple Access (OFDMA) scheme, the method comprising the steps of:

generating a frame of a current transmission of a broadcast service, the frame including a broadcast packet and a physical layer transmission information element (DL_MAP) comprising a broadcast service connection identifier (CID) for the broadcast packet and information indicating a data region where the broadcast packet is located in [a] *the* frame, wherein the frame further comprising a broadcast configuration message including timing information associated with a next transmission of the broadcast service relative to the current transmission; and transmitting the frame to at least one mobile station.

2. The method of claim 1, wherein the data region information comprises an offset of an OFDMA symbol, a number of OFDMA symbol, an offset of a subchannel and a number of subchannels.

3. The method of claim 1, wherein the timing information associated with the next transmission comprises an offset value indicating a difference between the current frame and a next frame at which the broadcast service is provided and a period value indicating period between the frames.

4. The method of claim 1, wherein the wireless communication system is compliant with an Institute of Electrical and Electronics Engineers (IEEE) 802.16 standard.

5. A method for receiving broadcast service data in a wireless communication system using an Orthogonal Frequency Division Multiple Access (OFDMA) scheme, the method comprising the steps of:

receiving, by a receiver, a frame of a current transmission of a broadcast service, the frame including a broadcast packet and a physical layer transmission information element (DL_MAP) comprising a broadcast service connection identifier (CID) for the broadcast packet and information indicating a data region where the broadcast packet is located in a frame, wherein the frame further comprising a broadcast configuration message including timing information associated with a next transmission of the broadcast service relative to the current transmission[.]*; and* receiving, by the receiver, a next frame of the next transmission including broadcast packets according to the timing information associated with the next-transmission.

6. The method of claim 5, wherein the data region information comprises an offset of an OFDMA symbol, a number of OFDMA symbol, an offset of a subchannel and a number of subchannels.

7. The method of claim 5, wherein the timing information associated with the next-transmission comprises an offset value indicating a difference between the current frame and a next frame at which the broadcast service is provided and a period value indicating period between the frames.

8. The method of claim 7, further comprising a step of periodically receiving a frame including broadcast packets according to the period value.

9. The method of claim 5, wherein the wireless communication system is complaint with an Institute of Electrical and Electronics Engineers (IEEE) 802.16 standard.

10. A method for transmitting broadcast service data in a wireless communication system using an Orthogonal Frequency Division Multiple Access (OFDMA) scheme, the method comprising the steps of:

transmitting, by a transmitter, a current frame of a current transmission of a broadcast service, the current frame including a broadcast packet and a physical layer transmission information element (DL_MAP) comprising a broadcast service connection identifier (CID) for the broadcast packet and information indicating a data region where the broadcast packet is located in a frame;

wherein the DL_MAP further comprising a broadcast MAP information element including an offset value indicating a difference between a current frame and a next frame of a next transmission at which the broadcast service is provided.

11. The method of claim 10, wherein the data region information comprises an offset of an OFDMA symbol, a number of OFDMA symbol, an offset of a subchannel and a number of subchannels.

12. The method of claim 10, wherein the wireless communication system is compliant with an Institute of Electrical and Electronics Engineers (IEEE) 802.16 standard.

13. A method for receiving broadcast service data in a wireless communication system using an Orthogonal Frequency Division Multiple Access (OFDMA) scheme, the method comprising the steps of:

receiving, by a receiver, a current frame of a current transmission of a broadcast service, the current frame including a broadcast packet and a physical layer transmission information element (DL_MAP) comprising a broadcast service connection identifier (CID) for the broadcast packet and information indicating a data region where the broadcast packet is located in a frame;

wherein the DL_MAP further comprising a broadcast MAP information element including a offset value indicating a timing difference between the current frame and a next frame of a next transmission at which the broadcast service is provided; and receiving, by a receiver, the next frame including broadcast packets according to the offset value.

14. The method of claim 13, wherein the data region information comprises an offset of an OFDMA symbol, a number of OFDMA symbol, an offset of a subchannel and a number of subchannels.

15. The method of claim 13, wherein the wireless communication system is compliant with an Institute of Electrical and Electronics Engineers (IEEE) 802.16 standard.

16. A method for transmitting broadcast service data in a wireless communication system using an Orthogonal Frequency Division Multiple Access (OFDMA) scheme, the method comprising the steps of:

transmitting, by a transmitter, a current of a transmission of a broadcast service, the current frame including a broadcast packet and a physical layer transmission information element (DL_MAP) comprising a broadcast service connection identifier (CID) for the broadcast packet and information indicating a data region where the broadcast packet is located in a frame, wherein the broadcast packet comprising a MAC Layer header including an offset value indicating a timing difference between the current frame and a next frame of a next transmission at which the broadcast service is provided.

17. The method of claim 16, wherein the data region information comprises an offset of an OFDMA symbol, a number of OFDMA symbol, an offset of a subchannel and a number of subchannels.

18. The method of claim 16, wherein the MAC Layer header further including the CID.

19. The method of claim 16, wherein the wireless communication system is compliant with an Institute of Electrical and Electronics Engineers (IEEE) 802.16 standard.

20. A method for receiving broadcast service data in a wireless communication system using an Orthogonal Frequency Division Multiple Access (OFDMA) scheme, the method comprising the steps of:

receiving, by a receiver, a current frame of a current transmission of a broadcast service, the current frame including packet and a physical layer transmission information element (DL_MAP) comprising a broadcast service connection identifier (CID) for the broadcast packet and information indicating a data region where the broadcast packet is located in a frame, wherein the broadcast packet comprising a MAC Layer header including an offset value indicating a difference between the current frame and a next frame of a next transmission at which the broadcast service is provided; and receiving, by the receiver, the next frame including broadcast packets according to the offset value.

21. The method of claim 20, wherein the data region information comprises an offset of an OFDMA symbol, a number of OFDMA symbol, an offset of a subchannel and a number of subchannels.

22. The method of claim 20, wherein the MAC Layer header further including the CID.

23. The method of claim 20, wherein the system is compliant with an Institute of Electrical and Electronics Engineers (IEEE) 802.16 standard.

24. A system for transmitting broadcast service data in a wireless communication system using an Orthogonal Frequency Division Multiple Access (OFDMA) scheme, the system comprises:

a transmitter for transmitting a frame of a current transmission of a broadcast service, the frame including a broadcast packet and a physical layer transmission information element (DL_MAP) comprising a broadcast service connection identifier (CID) for the broadcast packet and information indicating a data region where the broadcast packet is located in a frame, wherein the frame including timing information associated with a next transmission of the broadcast service relative to the current transmission; and a receiver for receiving a next frame of the next transmission including broadcast packets according to the timing information associated with the next transmission.

25. The method of claim 24 wherein the timing information associated with the next transmission comprises a offset value indicating a difference between a current frame and a next frame at which the broadcast service is provided and a period value indicating a time period between the frames.

*26. The method of claim 5, wherein the timing information associated with the next transmission comprises a value indicating a difference between the current frame and the next frame at which the broadcast service is provided.*

*27. An apparatus for transmitting broadcast service data in a broadcasting system, the apparatus comprising:*

*a processor for generating a frame of a current transmission of a broadcast service, the frame including broadcast service data and information for physical layer transmission, the information comprising an identifier for identifying the broadcast service and information indicating a data region where the broadcast service data is located in the frame; and*

*a transmitter for transmitting the frame to at least one receiver,*

*wherein the information for physical layer transmission further comprises timing information indicating an interval between a frame of a next transmission of the broadcast service and the frame of the current transmission.*

*28. The apparatus of claim 27, wherein the data region information comprises an offset of an OFDMA symbol, a number of OFDMA symbols, an offset of a subchannel and a number of subchannels.*

*29. The apparatus of claim 27, wherein the timing information associated with the next transmission comprises a value indicating period between the frames at which the broadcast service is provided.*

*30. The apparatus of claim 27, wherein the timing information associated with the next transmission comprises a value indicating a difference between the current frame and the next frame at which the broadcast service is provided.*

*31. An apparatus for receiving broadcast service data in a broadcasting system, the apparatus comprising:*

*a receiver for receiving a frame of a current transmission of a broadcast service; and*

*a processor for processing the frame including broadcast service data and information for physical layer transmission, the information comprising an identifier for identifying the broadcast service, information indicating a data region where the broadcast service data is located in the frame and timing information indicating an interval between a frame of a next transmission of the broadcast service and the frame of the current transmission,*

*wherein the receiver receives the frame of the next transmission based on the timing information.*

*32. The apparatus of claim 31, wherein the data region information comprises an offset of an OFDMA symbol, a number of OFDMA symbols, an offset of a subchannel and a number of subchannels.*

*33. The apparatus of claim 31, wherein the timing information associated with the next transmission comprises a value indicating period between the frames at which the broadcast service is provided.*

*34. The apparatus of claim 31, wherein the timing information associated with the next transmission comprises a value indicating a difference between the current frame and the next frame at which the broadcast service is provided.*

*35. A method for transmitting broadcast service data in a broadcasting system, the method comprising the steps of:*

*generating, by a transmitter, a frame of a current transmission of a broadcast service, the frame including broadcast service data and information for physical layer transmission, the information comprising an identifier for identifying the broadcast service and information indicating a data region where the broadcast service data is located in the frame,*

*wherein the information for physical layer transmission further comprises timing information indicating an interval between a frame of a next transmission of the broadcast service and the frame of the current transmission; and*

*transmitting the frame of the current transmission to at least one receiver.*

*36. The method of claim 35, wherein the information indicating a data region comprises an offset of an OFDMA symbol, a number of OFDMA symbol, an offset of a subchannel and a number of subchannels.*

*37. The method of claim 35, wherein the timing information associated with the next transmission comprises a value indicating period between the frames at which the broadcast service is provided.*

*38. The method of claim 35, wherein the timing information associated with the next transmission comprises a value indicating a difference between the current frame and the next frame at which the broadcast service is provided.*

*39. A method for receiving broadcast service data in a broadcasting system, the method comprising the steps of:*

*receiving, by a receiver, a frame of a current transmission of a broadcast service, the frame including broadcast service data and information for physical layer transmission, the information comprising an identifier for identifying the broadcast service and information indicating a data region where the broadcast service is located in the frame,*

*wherein the information for physical layer transmission further comprises timing information indicating an interval between a frame of a next transmission of the broadcast service and the frame of the current transmission; and*

*receiving, by the receiver, the frame of the next transmission based on the timing information.*

*40. The method of claim 39, wherein the information indicating a data region comprises an offset of an OFDMA symbol, a number of OFDMA symbol, an offset of a subchannel and a number of subchannels.*

*41. The method of claim 39, wherein the timing information associated with the next transmission comprises a value indicating period between the frames at which the broadcast service is provided.*

* * * * *